United States Patent Office 3,051,282
Patented Aug. 28, 1962

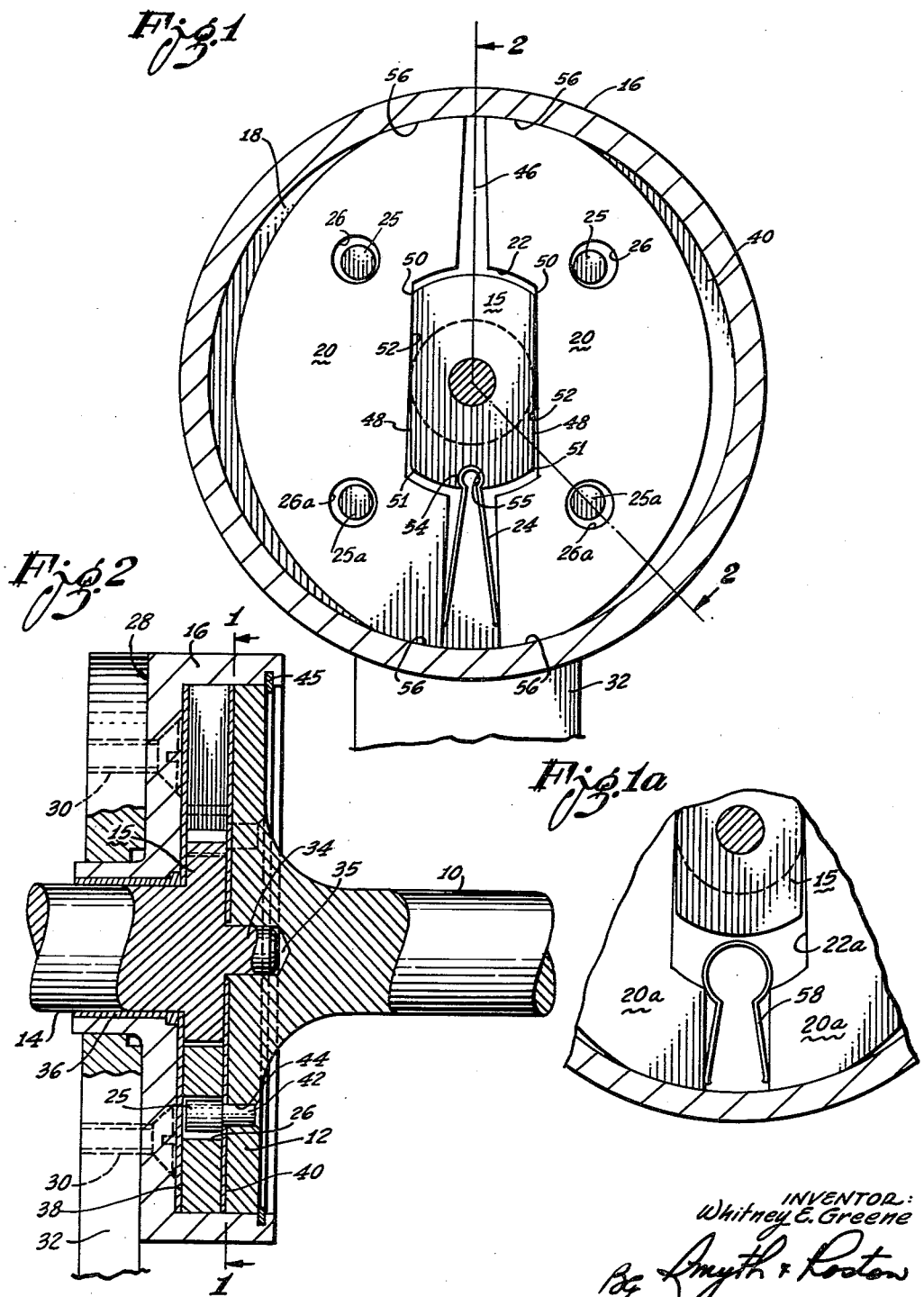

3,051,282
SELF-LOCKING ROTARY TRANSMISSION
Whitney E. Greene, 712 S. Wilton Place,
Los Angeles, Calif.
Filed Dec. 15, 1959, Ser. No. 859,802
4 Claims. (Cl. 192—8)

This invention relates to means for transmitting torque from a rotary input member to a rotary output member with provision for locking the rotary output member automatically in the absence of input torque. Such a self-locking power transmission has numerous uses in various fields, being applicable, for example, to automation equipment, winches, hydraulic and pneumatic rotors, tape recorders, ball-screw mechanisms, airfoil and hydrofoil controls, valves, etc.

Broadly described, the self-locking device is of the type in which a rotary input shaft is operatively connected to a rotary output shaft inside a fixed cylindrical wall with locking shoes engageable with the surrounding cylindrical wall to immobilize the output shaft whenever the input shaft is idle. The locking shoes are continuously urged outward by suitable spring means into effective engagement with the fixed surrounding wall but retract radially inwardly to release positions in response to the application of torque by the input shaft.

The problem to which the invention is directed is to achieve efficiency, reliability, and a long trouble-free service life by means of simple structure. In general, this object is accomplished by combining spring-actuated locking shoes with a non-circular portion of the output shaft and by operatively connecting the input shaft to the output shaft by means which cams the locking shoes to release positions in response to the transmission of torque by the input shaft.

In the preferred practice of the invention, the means for operatively connecting the two shafts comprises the locking shoes themselves together with the means that exerts cam action on the shoes.

The features and advantages of the invention may be understood by reference to the following detailed description of a selected embodiment of the invention considered with the accompanying drawings.

In the drawings, which are to be regarded as merely illustrative:

FIG. 1 is a sectional view of a selected embodiment of the invention taken as indicated by the line 1—1 of FIG. 2;

FIG. 1a is a fragmentary view similar to FIG. 1 showing a modification of the embodiment.

FIG. 2 is a section of the same embodiment taken as indicated by the angular line 2—2 of FIG. 1; and The principal parts of the particular embodiment of the invention shown in FIGS. 1 and 2 include: an input shaft 10 having an integral disc 12 at its inner end; an output shaft 14 formed with an integral end member 15 of non-circular configuration; a fixed circumferential wall 16 surrounding both the disc 12 and the non-circular end member 15 and cooperating with the non-circular end member to form an enclosed radial space 18; shoe means in the radial space in the form of a pair of shoes 20 which together form a non-circular opening 22 around the non-circular member 15; spring means in the form of a leaf spring 24 acting between adjacent ends of the pair of shoes 20; and a plurality of eccentrically positioned members in the form of a first pair of pins 25 and a second pair of pins 25a that are fixedly mounted on the disc 12 and extend longitudinally therefrom into corresponding over-sized circular apertures in the shoes 20, the first pair of pins 25 extending into a corresponding pair of over-sized apertures 26 and the second pair of pins 25a extending into a corresponding second pair of oversized apertures 26a.

The fixed circumferential wall 16 is part of a cup-shaped member 28 that is fixedly attached by screws 30 to a fixed support arm 32. In the construction shown, the output shaft 14 is centered relative to the input shaft 10 by a small hub 34 that is journaled in an axial end bore 35 in the input shaft. The output shaft 14 may be journaled in a suitable bearing 36 in the cup-shaped member 28 to maintain both the input shaft and the output shaft accurately coaxial with the fixed circumferential wall 16.

In the construction shown, a thin washer 38 lines the radial wall of the cup-shaped member 28 on one side of both the non-circular member 15 and the shoes 20, a second thin washer 40 being positioned on the other side of both the non-circular member and the shoes adjacent the disc 12. The eccentrically positioned pins 25 have reduced root portions 42 which are snugly mounted in corresponding bores 44 in the disc 12, the reduced root portions extending through corresponding apertures in the washer 40. The described assembly is confined in the cup-shaped member 28 by a suitable snap ring 45 that seats in a corresponding inner circumferential groove in the fixed circumferential wall 16.

In this embodiment of the invention, the non-circular member 15 that is integral with the output shaft 14 is elongated diametrically, being at least approximately symmetrical to a diameter 46 through the axis of rotation of the two shafts. The two shoes 20 lie on opposite sides of the diameter 46. In the construction shown, the non-circular member 15 is of generally rectangular configuration since it has two parellel sides 48 and four corners comprising a first pair of corners 50 and a second pair of corners 51. The non-circular opening 22 that is formed by the two shoes 20 is of a corresponding generally rectangular configuration having two side edges 52 which cooperate with the side surfaces 48.

The leaf spring 24 may be of the configuration shown in FIG. 1. The leaf spring 24 is a doubled leaf spring that is folded to form a rounded portion 54. The non-circular member 15 is formed with a corresponding rounded recess 55 to engage the rounded portion 54 of the leaf spring and thus hold the leaf spring in position in opposition to centrifugal force.

The two shoes 20 are adapted to make engagement with the surrounding fixed circumferential wall 16 for the purpose of immobilizing the non-circular member 15 when the input shaft 10 is idle. In this instance, the engagement is frictional but the shoes and the inner surface of the fixed circumferential wall may be serrated to make the engagement positive if desired. Each of the two shoes 20 is formed with two opposite end surfaces 56 which make snug frictional contact with the inner circumferential surface of the fixed wall 16 when the two shoes are spread apart by the spring 24 and are thereby positioned as shown in FIG. 1.

It is apparent in FIG. 1 that the separation force exerted by the leaf spring 24 tends to shift the two shoes 20 circumferentially around the inner surface of the fixed circumferential wall 16 and thus drives each of the two shoes 20 to binding positions at which the pair of straight edges 52 of the two shoes press against the pair of corners 50 of the non-circular member 15 from opposite directions to immobilize the non-circular member relative to the fixed circumferential wall 16 in a tight manner. Thus backlash is eliminated since there is no freedom for rotary motion for the pair of confined corners 50 of the non-circular member 15 against the two opposed confining edges 52 of the shoes. In effect, the two shoes are wedged in place to grip the non-circular member 15 by the pair of corners 50 to confine the non-circular member 22 in a non-yielding manner.

It is further apparent in FIG. 1 that if the input shaft 10 is rotated in either direction relative to the output shaft 14, one of the pins 25 will act on the bore 26 of the appropriate one of the shoes 20 for retraction of the shoe from the corresponding corner 50 of the non-circular member 15. Thus with the parts positioned as shown in FIG. 1, clockwise rotation of the input shaft causes the right-hand pin 25 to act on the right-hand oversized aperture 26 with cam action to retract the right-hand shoe 20 out of clamping engagement with the right-hand corner 50 of the non-circular member 15. It is apparent that the two pins 25 may be aptly termed driving means. As soon as the input shaft 10 stops rotating, the leaf spring 24 functions automatically to spread the two shoes 20 apart and to shift the two shoes into their binding positions.

A special advantages is that the shoes automatically compensate for wear both on the shoes and on the periphery of the non-circular member. Consequently, the efficiency of the self-locking action is maintained over a long service life.

FIG. 1a shows how the described construction may be slightly modified. The two shoes 20a in FIG. 1a form an opening 22a that is elongated to make room for a leaf spring 58 as well as to make room for the previously mentioned non-circular member 15. In all other respects, the modified construction is similar to the first described construction to function in the same manner.

My description in specific detail of the selected embodiment of the invention will suggest various changes, substitutions and other departures from my disclosure within the spirit and scope of the appended claims.

I claim:

1. Means to transmit actuating force from a rotary input member to a rotary output member on the same axis and to immobilize the rotary output member automatically in the absence of such force, comprising: a non-circular member on said axis united with said output member for rotation therewith; a fixed circumferential wall concentric to said axis and surrounding said non-circular member to define therewith a radial space; a pair of shoes in said radial space on opposite sides of a diameter through said axis, said shoes forming a central non-circular opening around said non-circular member for mutual engagement between the pair of shoes and the non-circular member; spring means acting between the two shoes at one end only of the pair of shoes to urge said shoes in opposite directions of rotation from said one end of the pair to grip the non-circular member from opposite sides with wedging action against the fixed circumferential wall when said input member is idle thereby to completely eliminate freedom of rotation of the non-circular member relative to the fixed circumferential wall when the input member is idle; and driving means extending into said radial space from said input member to engage said shoes for transmitting rotation from the input member to the non-circular member through the shoes and to retract the shoes out of wedging engagement with the fixed circumferential wall to permit rotation of the non-circular member.

2. Means to transmit actuating force from a rotary input member to a rotary output member on the same axis and to immobilize the rotary output member automatically in the absence of such force, comprising: a non-circular member on said axis united with said output member for rotation therewith; a fixed circumferential wall concentric to said axis and surrounding said non-circular member to define therewith a radial space; a pair of shoes in said radial space on opposite sides of a diameter through said axis, said shoes forming a central non-circular opening around said non-circular member for mutual engagement between the pair of shoes and the non-circular member; spring means acting between the two shoes at one end only of the pair of shoes to urge said shoes in opposite directions of rotation from said one end of the pair to grip the non-circular member from opposite sides with wedging action against the fixed circumferential wall when said input member is idle thereby to completely eliminate freedom of rotation of the non-circular member relative to the fixed circumferential wall when the input member is idle; and driving means extending into said radial space from said input member to drive said shoes selectively against said non-circular member for rotation thereof in response to rotation of the input member in opposite directions and to retract said shoes selectively to permit such rotation of the non-circular member.

3. Means to transmit actuating force from a rotary input member to a rotary output member on the same axis and to immobilize the rotary output member automatically in the absence of such force, comprising: a non-circular member on said axis united with said output member for rotation therewith; a fixed circumferential wall concentric to said axis and surrounding said non-circular member to define therewith a radial space; a pair of shoes in said radial space on opposite sides of a diameter through said axis, said shoes forming a central non-circular opening around said non-circular member for mutual engagement of the pair of shoes and the non-circular member, said shoes comprising a first shoe on one side of the non-circular member and a second shoe on the other side of the non-circular member; spring means acting between the two shoes at one end only of the pair of shoes to urge said shoes in opposite directions of rotation from said one end of the pair to grip the non-circular member from opposite sides with wedging action against the fixed circumferential wall when said input member is idle thereby to completely eliminate freedom of rotation of the non-circular member relative to the fixed circumferential wall when the input member is idle; and driving means extending into said radial space from said input member, said driving means being responsive to rotation of the input member in a first rotary direction to engage said first shoe to transmit rotation in said first rotary direction to the non-circular member through the first shoe and to engage the second shoe to retract the second shoe in said first rotary direction out of wedging engagement with the fixed circumferential wall to permit the non-circular member to rotate in said first rotary direction, said driving means being responsive to rotation of the input member in the opposite second rotary direction to engage said second shoe to transmit rotation in said second rotary direction to the non-circular member through the second shoe and to engage the first shoe and to retract the first shoe in said second rotary direction out of engagement with the fixed circumferential wall to permit the non-circular member to rotate in said second rotary direction.

4. A combination as set forth in claim 3 in which said driving means comprises two elements extending into corresponding apertures in the two shoes respectively, said apertures being towards the end of the pair of shoes opposite from said one end.

References Cited in the file of this patent

UNITED STATES PATENTS

| 297,330 | Wright | Apr. 22, 1884 |
| 822,268 | Geisenhoner | June 5, 1906 |
| 1,575,038 | Clas | Mar. 2, 1926 |
| 1,617,745 | Cousinard | Feb. 15, 1927 |
| 2,771,789 | Rossman et al. | Nov. 27, 1956 |
| 2,995,226 | Gilder | Aug. 8, 1961 |

FOREIGN PATENTS

| 101,869 | Switzerland | Oct. 16, 1923 |